US012135005B2

(12) United States Patent
Francisco et al.

(10) Patent No.: US 12,135,005 B2
(45) Date of Patent: Nov. 5, 2024

(54) ARRAY FOR ARRANGING WAVE ENERGY CONVERTERS IN A WAVE POWER PARK

(71) Applicant: SEABASED LIMITED, Dublin (IE)

(72) Inventors: Francisco Gemo Albino Francisco, Uppsala (SE); Anders Kronberg, Lysekil (SE)

(73) Assignee: SEABASED LIMITED, Dublin (IE)

( * ) Notice: Subject to any disclaimer, the term of this patent is extended or adjusted under 35 U.S.C. 154(b) by 0 days.

(21) Appl. No.: 18/008,835

(22) PCT Filed: Jun. 7, 2021

(86) PCT No.: PCT/SE2021/050542
§ 371 (c)(1),
(2) Date: Dec. 7, 2022

(87) PCT Pub. No.: WO2021/251879
PCT Pub. Date: Dec. 16, 2021

(65) Prior Publication Data
US 2023/0213016 A1  Jul. 6, 2023

(30) Foreign Application Priority Data
Jun. 8, 2020 (EP) ..................... 20178669

(51) Int. Cl.
*F03B 13/00* (2006.01)
*F03B 13/18* (2006.01)
*B63B 35/44* (2006.01)

(52) U.S. Cl.
CPC .......... *F03B 13/1865* (2013.01); *B63B 35/44* (2013.01); *B63B 2035/4466* (2013.01)

(58) Field of Classification Search
CPC ................ F03B 13/1865; B63B 35/44; B63B 2035/4466; B63B 21/50; F05B 2220/707;
(Continued)

(56) References Cited

U.S. PATENT DOCUMENTS

| 5,549,445 A | 8/1996 | Schremp |
| 2010/0033016 A1 | 2/2010 | Thorburn et al. |

(Continued)

FOREIGN PATENT DOCUMENTS

| EP | 1 474 607 | 11/2004 |
| IN | 110 886 676 | 3/2020 |

(Continued)

OTHER PUBLICATIONS

The International Search Report (ISR) with Written Opinion for PCT/SE2021/050542 dated Jul. 2, 2021, pp. 1-12.

(Continued)

*Primary Examiner* — Julio C. Gonzalez
(74) *Attorney, Agent, or Firm* — McDonnell Boehnen Hulbert & Beghoff LLP

(57) ABSTRACT

Disclosed herein is an array including at least ten wave power converters and at least one marine substation, each wave energy converter including a floating body, a wire, a housing anchored in a seabed or lakebed, the housing including a stator and a seesawing translator. The seesawing translator is connected via the wire to the floating body and each of the at least ten wave power converters is electrically connected to the marine substation. The at least ten wave energy converters are arranged on a symmetric, open, concave line, where a symmetry axis is at least more or less parallel to a primary wave direction and where the marine substation is arranged on the symmetry axis.

11 Claims, 3 Drawing Sheets

(58) Field of Classification Search
CPC ............ F05B 2240/40; F05B 2240/917; F05B 2250/712; Y02E 10/30
See application file for complete search history.

(56) References Cited

U.S. PATENT DOCUMENTS

2011/0308244 A1   12/2011   Findlay
2013/0147198 A1    6/2013   Leijon et al.

FOREIGN PATENT DOCUMENTS

WO   WO-2010085188 A1 *  7/2010  .......... F03B 13/1845
WO   2014/172686        10/2014
WO   2017/074237         5/2017

OTHER PUBLICATIONS

Göteman Malin et al. "Optimizing wave energy parks with over 1000 interacting point-absorbers using an approximate analytical method" International Journal of Marine Energy 10 (2015), pp. 113-126.
European Search Report for Patent Application No. EP 20178669 dated Oct. 12, 2020, 2 pages.

* cited by examiner

ARRAY FOR ARRANGING WAVE ENERGY CONVERTERS IN A WAVE POWER PARK

CROSS REFERENCE TO RELATED APPLICATIONS

This application is a U.S. national phase of International Application No. PCT/SE2021/050542, filed on Jun. 7, 2021, which claims priority to European Application No. 20178669.6, filed Jun. 8, 2020, both of which are incorporated by reference herein in their entirety.

FIELD OF THE DISCLOSURE

The disclosure relates to the field of Wave Power Parks comprising a plurality of Wave Power Converters arranged in several arrays. The inventive idea relates to the specific aspect of arranging Wave Power Converters in an array for optimizing power output, minimizing power fluctuations and optimizing used equipment and sea space.

BACKGROUND

When designing wave power parks in the past circular or star shaped arrays or patterns were used to arrange the wave energy converters. The patterns or arrays as described herein are always looked at in a top down view, from the sky towards the surface of the ocean and the seabed surface, respectively.

FIGS. 1 and 2 illustrate the prior art how wave energy converters were arranged in wave power parks previously.

FIG. 1 illustrates a cluster or array 6 of a plurality of wave energy converters 12 and their corresponding buoys 18, in array according to the prior art. Each of the wave energy converters 12 comprising a seabed (or lakebed) housing anchored to the seabed, said seabed housing comprising a generator with a stator and a translator/oscillating body, whereby the oscillating body is connected via a wire to the buoy 18 on the water surface. The generators are connected via cables 16 to the marine substation 14, which is typically also arranged and anchored to the seabed. From the marine substation 14, a cable 2 further connects the marine substation 14 to a connection point where several arrays 6 are connected (c.f. FIG. 2). The marine substation 14 comprises a rectifier, a DC/DC converter for changing direct current (DC) to alternating current (AC) and a transformer. Alternatively, the marine substation 14 comprises an active rectifier, an inverter, and a transformer. The array 6 comprises eight (8) wave energy converters 12. Any other number is of course possible, the number eight is just chosen for illustrative purposes. The buoys 18 are all of the same type and of the same size. The buoys 18 and therewith the wave energy converters 12 are arranged on a circle and spaced at regular intervals on the circle. The circle 13 is shown in a dashed line for illustrative purposes. Reference number 3 indicates and illustrates a primary wave direction versus the array 6. The extension of the troughs and peaks of each wave is at least more or less perpendicular to the primary wave direction 3, some of these troughs and peaks are indicated in FIG. 1 with dashed lines. In this particular example a wave following and traveling along the primary wave direction 3 hits the buoy 18 of the wave energy converter 12 at position a first, then the wave travels further and hits two wave energy converters 12 and their corresponding buoys 18 at least more or less at the same time at position b. One problem with such an arrangement is that four wave energy converters 12, respectfully their generator have a power peak at the same time, namely when a wave peak or trough hits the position b. This leads to power fluctuations in the array 6, since at least some of the wave energy converters 12 have an energy peak at the same time, in particular if it is considered that many more wave energy converters 12 are typically arranged in a array 6 and in many cases they are arranged on double circles 13, more or less half of the amount of wave energy converters 12 on an inner circle (not shown) and more or less the other half on an outer circle (not shown). In addition, in the example of FIG. 1 the wake of each wave is affected by the buoys 18 it already passed and therewith the energy harvesting of the waves is not optimal. The wake is the drag of the buoy 18 that was lifted. In other words each buoy 18 and wave energy converter 12 that is arranged upstream the wave direction 3 and at least more or less on the same path (line arranged perpendicular to the wave direction 3) as a buoy 18 further downstream leaves less energy to harvest for the buoy 18 and wave energy converter 12, respectively, arranged further downstream and on the same line or path along the wave direction 3. Tests and simulations have shown that a high number of wave energy converters 12 per array 6 and wave power park 1 has advantages and disadvantages. When the amount of wave energy converters 12 is higher than ten units, the addition of wave energy converters 12 leads to a decrease in power fluctuation whereas the average power generated per unit decreases. So, there is a balance to achieve for optimal energy generation, stable energy generation, and minimal material use.

As an example, increasing the amount of wave energy converters by 30% may reduce the power fluctuations by roughly 7% (positive effect) but it also reduces the average power generated by each generator unit by 3%. This can be cost effective for small wave power parks or arrays but it is not cost effective for large arrays, since a lot of cables and raw materials are needed to provide a high amount of wave energy converters. This is also not advantageous from a sustainability stand point, since a lot of material is needed.

FIG. 2 illustrates how the arrays 6 comprising the wave energy converters 12 and their buoys 18, respectively, have been arranged previously, for instance in an array as shown in FIG. 2, according to the prior art. The primary wave direction 3 is again indicated and also the extension of the troughs and peaks of the waves traveling towards the wave power park 1 in dashed lines. The dashed lines are again oriented at least more or less perpendicular to the primary wave direction. The five arrays 6 are connected to a connection point 20 via the marine substations 14 using cables 2, 16. The connection point 20 is then further connected to a station by an export cable. From FIG. 2 it becomes clear that there is a certain power fluctuation in the wave power park 1, since the troughs and peaks of the waves move many of the buoys 18 simultaneously, which leads to power peaks and power valleys or power dips and therewith energy peaks and troughs. The cables 2, 16, the marine substations 14 and the connection point 20 all need to be designed to be able to cope with these power peaks, which leads to an unstable power output, to the need to use more resources since the equipment has to be adapted so that it can cope with the power peaks and therewith higher costs. The design of the array shown in FIG. 2 is further not optimized for optimal cable use. In addition, there is also the problem of the wake generated by buoys 18 that are arranged upstream versus buoys 18 that are arranged downstream, as seen in the wave direction 3.

The geometry of the arrays illustrated in FIGS. 1 and 2 are superior to rectangular arrays, since, the power fluctuations are much higher with rectangular arrays than with circular or star arrays as illustrated in FIGS. 1 and 2.

Another problem with star arrays of wave energy converters is that it is difficult to park a maintenance vessel suitably in order to shield the buoys and therewith the wave energy converters. Further the access to the marine substation is not that easily possible, since wave energy converters are arranged around the marine substation, as shown in FIG. 1.

SUMMARY

An object of the present disclosure is to provide an optimized array for wave energy converters that allows to generate a stable energy output, to optimize the used area of sea space and also makes sure that material resources are used carefully.

Another object is to provide an array that allows to reduce risks and optimize costs.

In view of the above-mentioned problems with power fluctuations, the inventor of the present disclosure has discovered that with a specific method of geometric arrangement of wave energy converters it is possible to reduce power fluctuations, optimize equipment use, reduce used sea-space and optimize costs.

Disclosed herein is an array comprising at least ten wave power converters and at least one marine substation. Each wave energy converter comprises a floating body, a wire, a housing anchored in the sea- or lakebed, said housing comprising a linear stator and a seesawing translator, whereby the seesawing translator is connected via the wire to the floating body. Further, each of the at least ten wave power converters is electrically connected to the marine substation. The at least ten wave energy converters are arranged on a symmetric, open, concave line, wherein a symmetry axis is parallel to a primary wave direction and wherein the marine substation is arranged on the symmetry axis.

The symmetric, open, concave line may be a symmetric, open, concave line.

Any number of wave energy converters is theoretically possible, even a number below ten. A suitable number could be between 15 and 25 wave energy converters, more preferably between 18 and 22 wave energy converters, for example 20 wave energy converters per array.

Arranging the wave energy converters on a symmetric, open, concave line has the advantage that the power fluctuations are reduced, since each wave moves buoys sequentially, in general not more than two buoys at the time.

In an embodiment an opening of the symmetric, open concave line is open towards the primary wave direction.

Having the opening of the symmetric, open, concave arrangement or array open towards the primary wave direction allows to position a maintenance vessel so that it blocks the incoming waves for maintenance.

In an embodiment the marine substation is arranged on the symmetry axis and on a same side of the symmetric, open concave line as the opening.

This reduces the amount of electric cables needed to interconnect the wave energy converters with the marine substation. It also facilitates maintenance of the array.

The symmetric, open concave line may be any of a semi-circular line, a semi-elliptic line, a horseshoe shape, a V-shaped line, a U-shaped line, or any combination thereof.

Herein all of the above-mentioned line-shapes are considered to be symmetric, open, and concave. Any combinations thereof as well. These line shapes or line designs all offer the above stated advantages in terms of power fluctuations, equipment, and electric cable use and maintenance facilitation.

The above described line shapes may even be arranged inverted as seen along the primary wave direction, thus with the opening directed away from the incoming waves of the primary wave direction.

The wave energy converters may be arranged at regular distances from one another on the symmetric, open, concave line. The regular distances may be from 15 m to 40 m, preferably 20 m to 35 m and even more preferably from 22 to 30 m.

The distance between the marine substation and the closest wave energy converter is about 30 to 90 m.

The minimum distance between the wave energy converters may be at least 25 m.

The distance between arrays in wave power parks may be at least 45 m.

The distances specified above are preferably measured between the closest entities, wave power converters and marine substations or arrays.

The above specified distances improve energy harvesting, reduce disturbances in the wave pattern, power fluctuations and reduce the influence of wake from buoys that are arranged upstream the wave direction.

The wave energy converters may be at least more or less, equally distributed on each side of the symmetry axis.

This may reduce the amount of electric cables used for the design of the array.

In an embodiment the at least ten wave energy converters may be arranged, at least more or less equally divided on at least two symmetric, open, concave lines, a first symmetric, open, concave line and a second symmetric, open, concave line, the first symmetric, open, concave line being arranged upstream the second symmetric, open concave line, as seen along the primary wave direction whereby the first- and the second symmetric, open, concave lines are arranged parallel with one another and so that they share the same symmetry axis.

This may reduce the sea-space used and also improve efficiency of the array for power generation.

When an array comprises a first symmetric, open, concave line of wave energy converters and a second symmetric, open, concave line of wave energy converters, then it is preferable that the amount of wave energy converters is about twenty (20), ten on each of the first—and second symmetric, open concave line. Of course, it is also conceivable to have more than twenty wave energy converters per array, In an embodiment the wave energy converters and their buoys, respectively that are arranged on the second symmetric, open, concave line further downstream the primary wave direction comprise floating bodies with greater buoyancy than the wave energy converters arranged on the first symmetric, open, concave line further upstream the primary wave direction.

In case circular hollow metallic or composite buoys are used the diameter of the buoys arranged on the second symmetric, open concave line are preferably about 15% to 30% larger than the ones arranged on the first symmetric, open concave line. In many cases the buoys shape may be toroidal or polyhedron, thus at least more or less doughnut shaped.

In buoyancy terms this is about 50% a 100% bigger buoyance between the buoys or floating bodies of the first symmetric, open concave line and the buoys or floating bodies of the second symmetric, open concave line.

Disclosed herein is also a wave power park comprising a plurality of arrays of the type described herein, whereby the marine substations of the arrays are arranged on a symmetric, open, concave line, the symmetric, open, concave line comprising an opening.

The opening may be directed away from the incoming waves and thus from the primary wave direction or it may be directed towards the incoming waves and the primary wave direction.

In an embodiment the arrays of the wave power park may be arranged so that the opening is directed away from the primary wave direction and incoming waves, respectively.

Such a design of the wave power park reduces material and equipment use, in particular the use of cables, and it optimizes the amount of sea space need for installing a wave power park.

The symmetric, open, concave line may be any of a V-shaped line, a U-shaped line, an open arched line, an open circular line, an open elliptic line or a combination thereof.

In addition to the above, herein the following definitions are used to explain and describe the disclosure.

Definitions

Primary Wave Direction

Every coastal area has one primary wave direction. In some cases, there may be two or three main wave directions, about plus minus 30 degrees rotated to the other. In particular in shore areas the primary wave direction is however rather stables and varies only with a few degrees. This can be used when wave power parks are planned and installed, since they are typically installed in coastal areas close to the shore, for example within 0-10 km from the shore. Determining the primary wave direction is important for the planning and the operation of the wave power park. Herein the primary wave direction is relating to the direction along which the waves travel, thus along which the wave peaks and wave troughs move. The primary wave direction can of course vary from area to area depending on primary winds, sea-shore structure and sea-base structure.

Wave Front

The wave front is a direction along which the wave troughs and wave peaks extend. The wave front is typically oriented perpendicular to the (primary) wave direction. As the primary wave direction so can the wave front vary its direction depending on winds, sea-shore structure and so on.

Wave Energy Converter

The arrays and arrangements described herein mainly refer to wave energy converters of the type as described in EP2318697 B1. Such a wave energy converter typically comprises a floating body, a wire and a housing anchored in the sea- or lakebed. The housing comprising a linear stator and a seesawing translator, whereby the seesawing translator is connected via the wire to the floating body. When waves move the floating body up and down the wire pulls the translator up and down in a seesawing movement. This produces energy since the translator moves along the stator, which creates inductive energy. This is on type of wave energy converter for which the described array is suitable, there may however be other types of wave energy converters that can be arranged in an array as described.

A Cluster or Array of Wave Energy Converters

The term cluster or array of wave energy converters used herein describes an arrangement of somewhere in between 10 to 30 wave energy converters arranged in an array and connected to a marine substation. A wave power park may consist of several such arrays. When the geometric arrangement of an array is described herein it is always described as seen in the bird (or drone) view thus from the top down; from the sky towards the ocean surface and seabed, respectively.

Symmetric, Open Concave Line or Geometry (as Seen from Above)

Herein a symmetric, open, concave line or geometry describes a line that is either V-shaped, U-shaped, at least more or less half elliptic, Y-shaped, at least more or less half circled, concave or any combination thereof. When the geometry of the symmetric, open concave line is described herein, it is always described as seen in the bird (or drone) view thus from the top down; from the sky towards the ocean surface and seabed, respectively.

BRIEF DESCRIPTION OF THE FIGURES

The present disclosure will now be described, for exemplary purposes, in more detail by way of an embodiment(s) and with reference to the enclosed drawings, in which.

DETAILED DESCRIPTION

Figure 1:
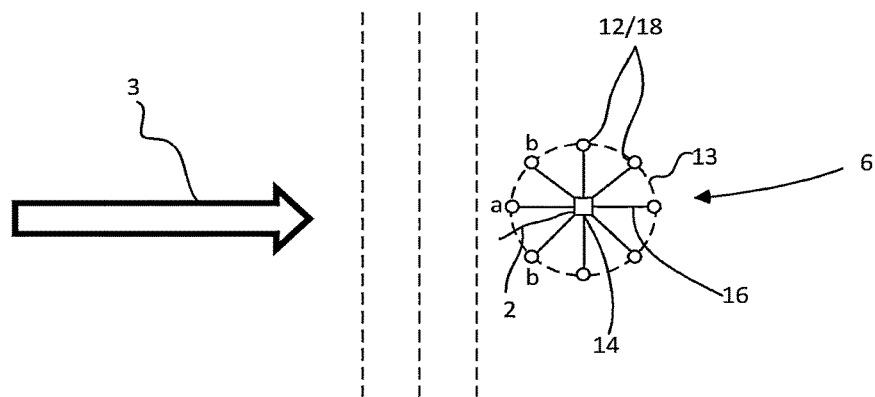
FIG. 1 schematically illustrates an array of wave energy converters according to the prior art.
Figure 2:
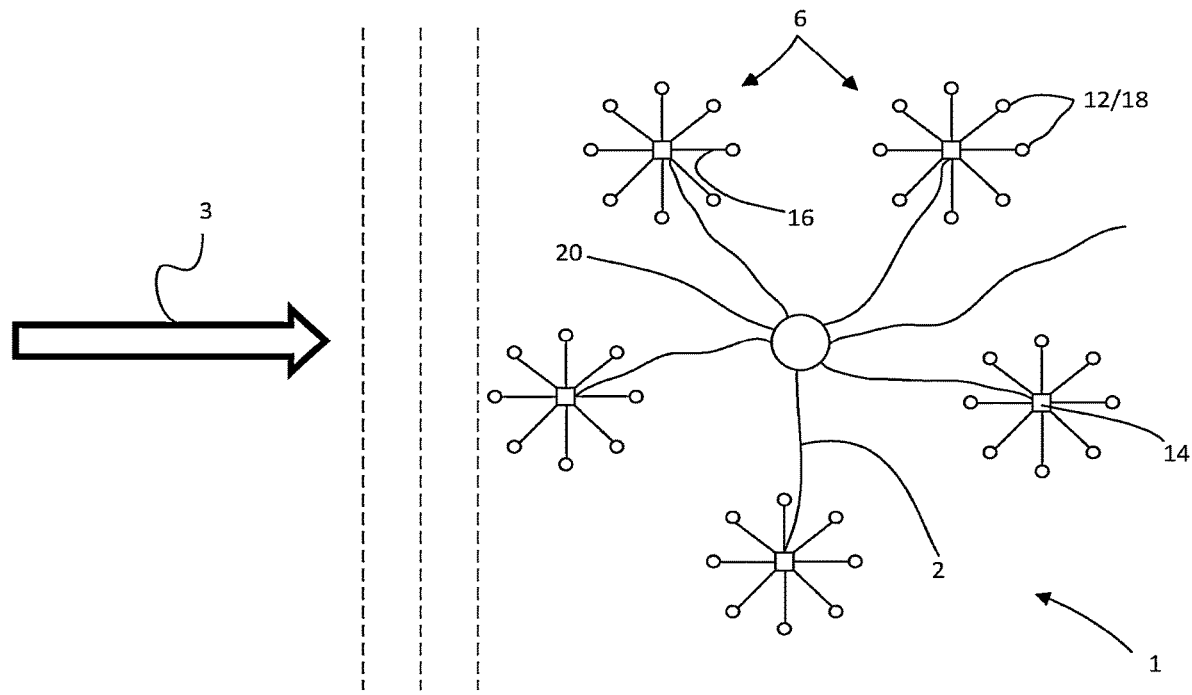
FIG. 2 schematically illustrates a wave power park comprising five arrays according to the prior art.
Figure 3:
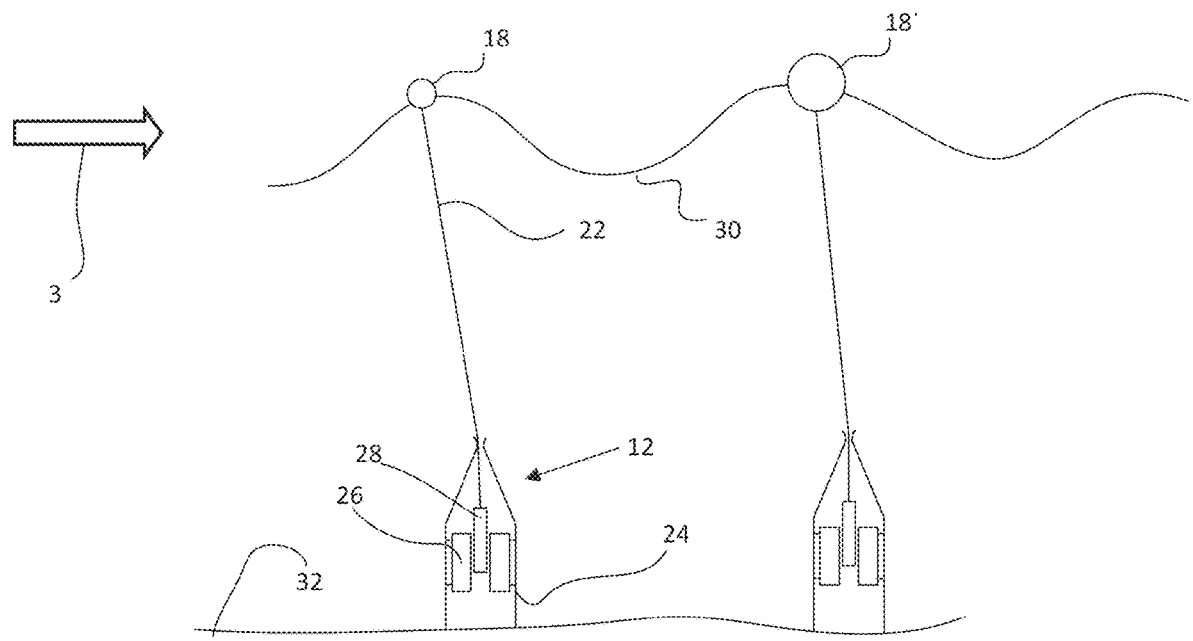
FIG. 3 schematically illustrates a wave energy converter of the type used for the arrays described herein.

FIG. 3 illustrates a wave energy converter 12 of the type described and used in the arrays described herein. The wave energy converter 12 comprises a buoy 18, a wire 22, a housing 24, which housing 24 is shown in a cross-sectional view for illustrative purposes, a stator 26 and a translator 28. The housing 24 is anchored on the seabed 32. The buoy 18 is configured to ride on the waves 30 that pass the wave energy converter along a primary wave direction 3. When the waves 30 pass, the buoy 18 is moved up and down thereby moving the translator 28 in a seesawing motion, which generates electric energy when the translator 28 moves along the stator 26 due to an electro inductive process. The size of the buoy 28 can be adapted according to the needs to generate a distinct seesawing motion of the translator 28, for instance if the wave energy generator 12 is placed further downstream, as seen a long the wave direction 3 as another wave energy converter (not shown) arranged upstream the one illustrated in FIG. 3.

FIG. 3 further illustrates how the wave energy converters that are arranged on the second symmetric, open, concave line further downstream the primary wave direction 3 comprise floating bodies 18' with greater buoyancy than the wave energy converters 12 arranged on the first symmetric, open, concave line further upstream the primary wave direction.

Figure 4:
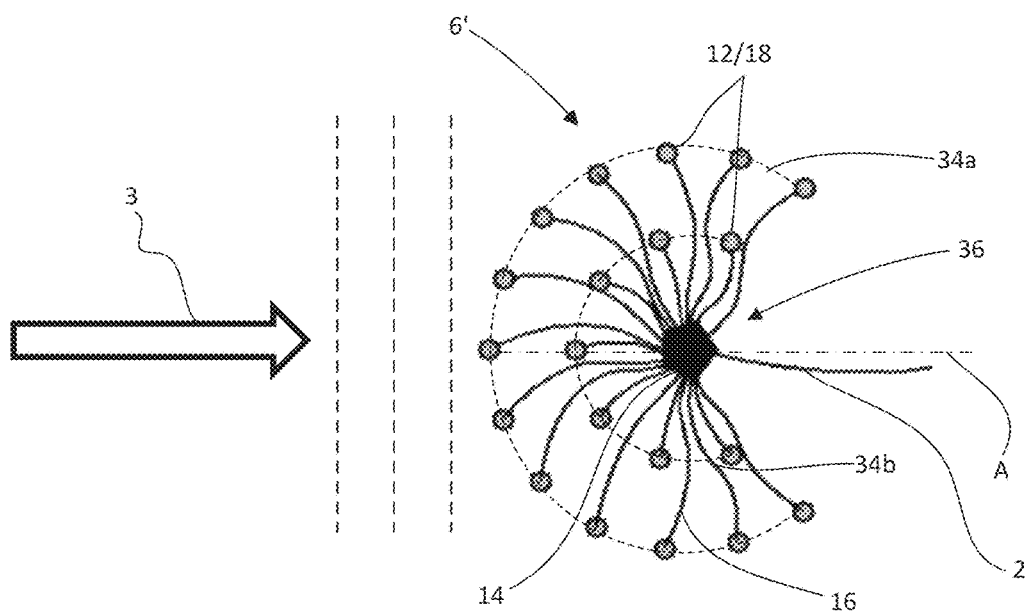
FIG. 4 schematically illustrates an array according to a first embodiment of the disclosure.

FIG. 4 illustrate a first array 6' of wave energy converters 12 and their buoys 18, respectively. The array 6' comprises twenty wave energy converters 12 arranged on two, a first symmetric, open concave line 34a and a second symmetric, open, concave line 34b, on which the wave energy converters 12 are arranged. The first symmetric, open, concave line 34a and the second symmetric, open, concave line 34b are shown in dashed lines for illustrative purposes. The first symmetric, open, concave line 34a comprises seven wave energy converters 12 and the second symmetric, open, concave line 34b comprises thirteen wave energy converters 12. The wave energy converters 12 arranged on the first- and the second symmetric, open, concave lines 34a, 34b, respectively, are spaced at regular intervals on their respective symmetric, open, concave lines. The distribution of the wave energy converters 12 on the first symmetric, open, concave line 34a and the second symmetric, open, concave line 34b can however be fifty/fifty thus ten converters 12 on each the first—and second symmetric, open, concave line 34a, 34b, respectively or any number between 7 and 13. In FIG. 4 the primary wave direction 3 is again indicated with the wave's troughs and peaks being shown with dashed lines. The first- and second symmetric, open, concave lines 34a, 34b are shown as incomplete circles in FIG. 4. Any other shapes of incomplete circles, elliptic shapes are of course conceivable, also half-circles and half ellipses. The first—and second symmetric, open, concave lines 34a, 34b are arranged parallel to one another and also so that they share the same symmetry axis A. The shape of the first—and second symmetric open, concave lines 34a, 34b may be described as horseshoe shaped or at least similar to a horseshoe shape. The first- and second symmetric, open, concave lines 34a, 34b are arranged within one another and rather snug. The shortest distance between the two symmetric, open, concave lines 34a, 34b are arranged with a distance of about 15 to 40 m, preferably 20 to 30 m and even more preferably about 25 m. The first symmetric, open, concave line 34a and the second symmetric, open, concave line 34b both describe an opening 36 of the array 6'. Alternatively, the array as illustrated in FIG. 4 may be arranged 180 degrees rotated with the opening 36 facing the incoming waves.

In FIG. 4, the size of the buoys 18 are the same on all wave energy converters 12, it is however possible to use buoys 18 that are bigger on the second symmetric, open, concave line 34b, since each incoming wave loses energy when lifting the buoys 18 of the first symmetric, open, concave line 34a. The average power per wave energy converter 12 increases when the buoy 18 is increased, in particular if the buoys 18 are increased along the primary wave direction 3, thus from the first symmetric, open, concave line 34a and the second symmetric, open, concave line 34b and so one, for example if more than two symmetric, open, concave lines are present (not shown).

The wave energy converters 12 illustrated in FIG. 4 are also electrically connected to the marine substation 14 via cables 16. The marine substation 14 is then further connected to a connection point 20 via a further electric cable 2.

Figure 5:
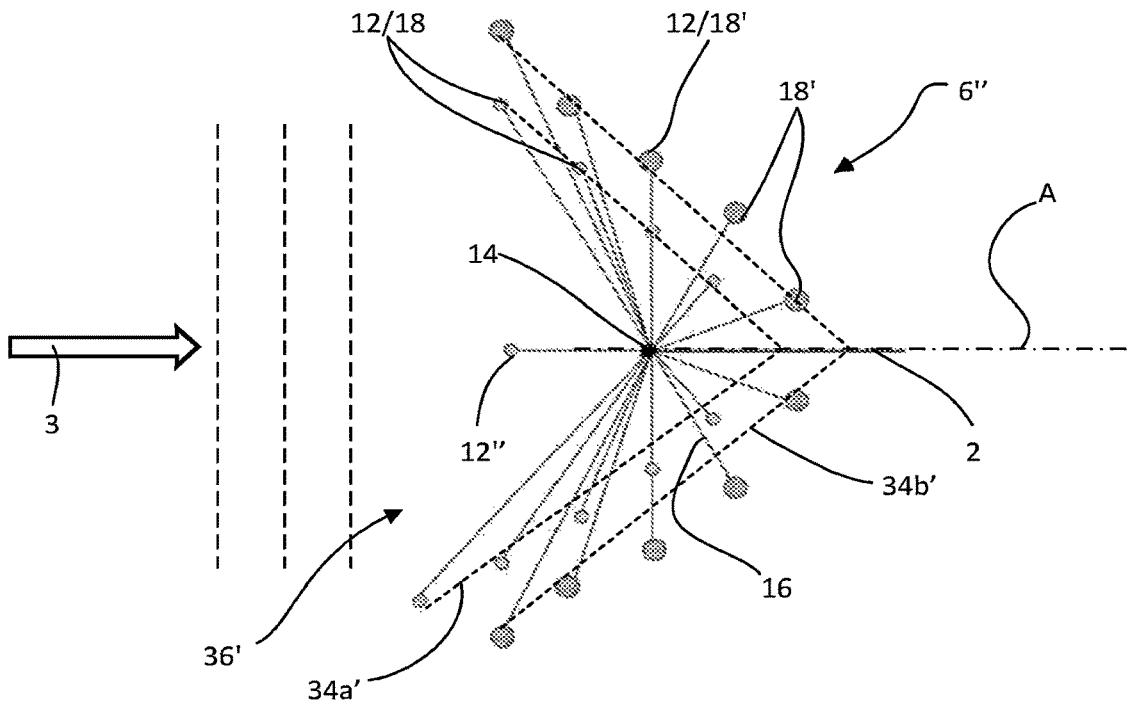
FIG. 5 schematically illustrates an array according to a second embodiment of the disclosure.

FIG. 5 discloses another possible array 6" shape according to an embodiment of the disclosure. The array 6" comprises twenty wave energy converters 12 and their corresponding buoys 18, 18'. The wave energy converters 12 are arranged on a first symmetric, open, concave line 34a' and a second symmetric, open, concave line 34b'. The first symmetric, open, concave line 34a' and the second symmetric, open, concave line 34b' are this time shown in a V-shape. The first symmetric, open, concave line 34a' and the second symmetric, open, concave line 34b' also describe an opening 36' where the waves can enter the array 6". The second symmetric, open, concave line 34b' arranged downstream the primary wave direction 3 of the first symmetric, open, concave line 34a' comprises ten wave energy converters 12 and their corresponding buoys 18' and the first symmetric, open, concave line 34a' comprises nine wave energy converters 12 and their corresponding buoys 18. One wave energy converter 12" is arranged in the center, close to a focal point of the first symmetric, open, concave line 34a' and the second symmetric, open, concave line 34b', and on the symmetry axis A and upstream the marine substation 14. This wave energy converter 12" is used as a reference for measuring the generated power and its value can be compared to the other wave energy converters 12 of the array 6".

Figure 6:
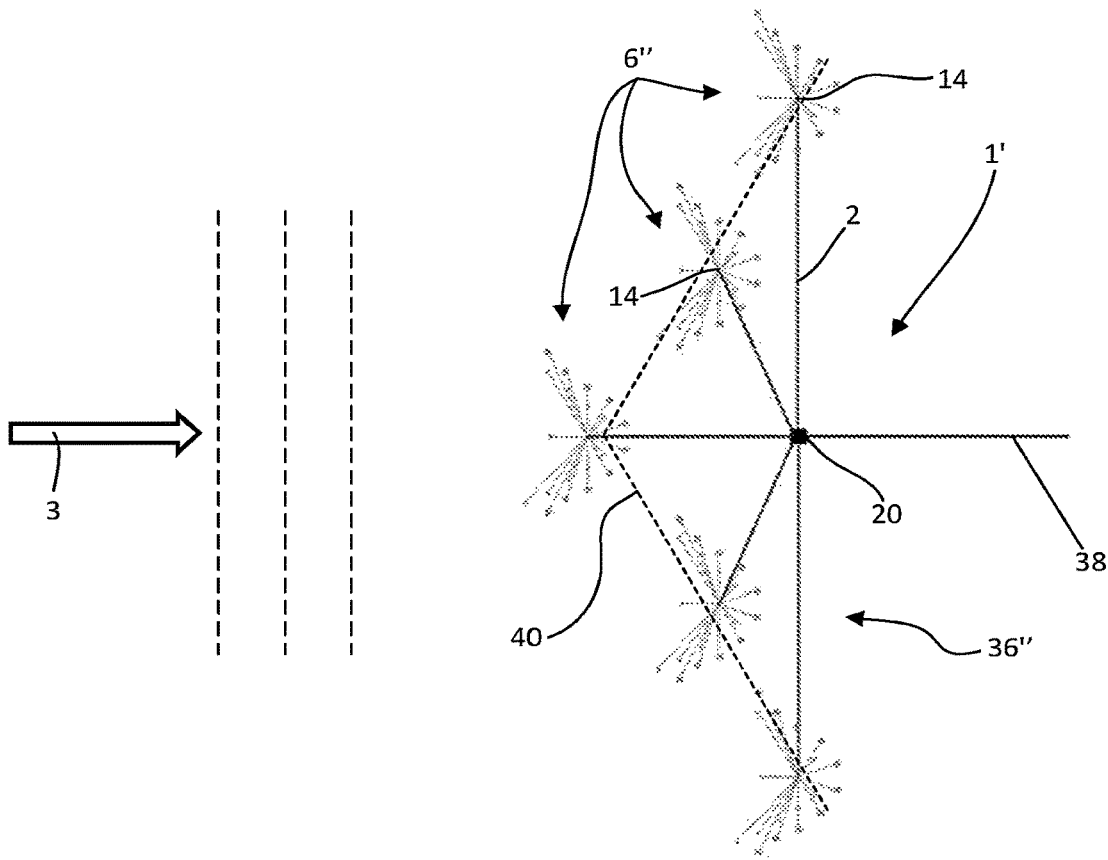
FIG. 6 schematically illustrates an embodiment of a wave power park having a plurality of arrays according to the second embodiment.

Each of the wave energy converters 12, 12" are electrically connected to the marine substation 14 via cables 16 and the marine substation is then further connected via an electric cable 2 to the connection point (c.f. FIG. 6). Again, the first symmetric, open, concave line 34a' and the second symmetric, open, concave line 34b' are arranged parallel with one another at a distanced as specified when describing FIG. 4 and sharing the same symmetry axis.

Any other possible shapes of first—and symmetric, open, concave lines 34a, 34a', 34b, 34b' are conceivable: For example, U shape, a combination of U and V shapes or a semi-elliptic shape, a semi-circular shape or any combination thereof.

In FIG. 5 the incoming peaks and troughs of the waves are again indicated with the dashed lines, as done so in FIG. 4.

The advantages with such array 6', 6" designs as shown in FIGS. 4 and 5 is that the power fluctuations are substantially reduced since the waves to not hit all buoys at the same time, maintenance is facilitated, since a maintenance vessel or ship can be parked close to the wave energy converter 12" (in FIG. 4 somewhere close to the buoys 18 that are hit first by the incoming waves) and therewith protect the entire array from incoming waves and also wind by closing the opening 36, 36'.

The array 6" in FIG. 5 is advantageous, since it reduces the wake that is created by each buoy 18 arranged upstream, as seen in the wave direction 3, a buoy 18' that is arranged downstream, as seen in the wave direction 3. The buoys 18' of the wave energy converters 12 arranged on the second symmetric, open, concave line 34b' are further chosen to have a higher buoyancy than the buoys 18 of the wave energy converters 12 arranged on the first symmetric, open, concave line 34a'. In case round buoys 18' are used the radius of the bigger buoys 18' are about 10 to 15% bigger. This improves the energy harvesting of the wave energy converters 12 arranged on the second symmetric, open, concave line 34b' and therewith the efficiency of the entire array 6'.

In addition to the above and in order to further reduce the wake of each buoy 18 arranged upstream, as seen along the primary wave direction 3, for a buoy 18' arranged further downstream, as seen along the primary wave direction 3, it is possible to arranged the wave energy converters 12 on the second symmetric, open, concave line 34b' in a shifted manner so that two buoys 18, 18' never come to lay on one straight line that is parallel with the symmetry axis A and the primary wave direction 3, respectively, if it is considered that the symmetry axis A is, at least more or less, parallel to the primary wave direction 3.

The details described regarding FIG. 4 are also valid for FIG. 5 but for the sake of simplicity not all items described in connection with FIG. 4 are herewith repeated.

The arrays 6', 6" described and shown in FIGS. 4 and 5 have further the advantage that in particular cable use is optimized. In both arrays 6', 6" the symmetry axis A is at least more or less parallel with the primary wave direction 3. It is however clear that the primary wave direction 3 can vary plus minus 10 degrees, since it is depending on nature, such as winds, wave climate and so on.

FIG. 6 discloses an arrangement of a wave power park 1' with five arrays 6" according to FIG. 5, whereby the marine substations 14 of the arrays 6" are arranged on an inverted V-shaped line 40, as seen in the primary wave direction 3. The marine substations 14 are also regularly spaced apart on the V-shaped line 40 so that wave energy converters 12 of neighboring arrays 6" are never closer than 40 m. An opening 36" of the V-shaped line 40 is directed away from the primary wave direction 3. Again, the peaks and troughs of the waves are indicated with dashed lines.

The marine substations 14 are electrically connected to a connection point 20 and the connection point 20 is then connected to a shore station via the cable 38. The wave power park 1', as shown in FIG. 6, optimizes the use of cables and uses the seabed-space or area in an efficient manner.

The illustration in FIG. 6 shows an inverted V-shaped line 40, it is however possible that this V-shaped line is not inverted and that the opening 36" is open towards the incoming waves of the primary wave direction 3. Also here, other shapes such as U-shapes, inverted U-shapes, half-circled shapes or half elliptic shapes inverted and not inverted are possible.

Although the wave power park 1' in FIG. 6 is shown with arrays 6" as illustrated in FIG. 5, it is of course conceivable to design a wave power park with any other arrays described herein, in particular the one shown in FIG. 4.

In addition, even if the arrays 6', 6" as illustrated in FIGS. 4 and 5 are illustrated with a first symmetric, open, concave line 34a, 34a' and a second, open, concave line 34b, 34b' it is possible to have arrays (not shown) with a single symmetric, open, concave line (not shown). The arrays do not necessarily need to comprise two symmetric, open, concave lines.

Alternatively, it is also conceivable to have arrays with more than two symmetric, open, concave lines, whereby the wave energy converters on each symmetric, open, concave line further downstream the primary wave direction have buoys with a larger buoyancy.

The invention claimed is:

1. An array comprising at least ten wave energy converters and at least one marine substation, each wave energy converter comprising a floating body, a wire, a housing anchored in a seabed or a lakebed, said housing comprising a stator and a seesawing translator, whereby the seesawing translator is connected via the wire to the floating body, each of the at least ten wave energy converters being electrically connected to the marine substation, wherein the at least ten wave energy converters are arranged on a symmetric, open concave line, wherein a symmetry axis is at parallel to a primary wave direction and wherein the marine substation is arranged on the symmetry axis, wherein the at least ten wave energy converters are arranged, equally divided on at least two symmetric, open concave lines, a first symmetric, open concave line and a second symmetric, open concave line, the first symmetric, open concave line being arranged upstream the primary wave direction, the second symmetric, open concave line, wherein the first symmetric, open, concave line and the second symmetric, open, concave line have the same symmetry axis and wherein the wave energy converters that are arranged on the second symmetric, open, concave line further downstream the primary wave direction comprise floating bodies with greater buoyancy than the wave energy converters arranged on the first symmetric, open, concave line further upstream the primary wave direction.

2. The array according to claim 1, wherein an opening of the symmetric, open concave line is open towards the primary wave direction.

3. The array according to claim 1, wherein the marine substation is arranged on the symmetry axis and on a same side of the symmetric, open concave line as the opening.

4. The array according to claim 1, wherein the symmetric, open concave line is any of a semi-circular line, a symmetric arched line, a semi-elliptic line, a horseshoe shaped line, a V-shaped line, a U-shaped line, or any combination thereof.

5. The array according to claim 1, wherein the wave energy converters are spaced at regular distances from one another on the symmetric, open, concave line.

6. The array according to claim 5, wherein the regular distances are from 15 m to 40 m.

7. The array according to claim 1, wherein the wave energy converters are, equally distributed on each side of the symmetry axis.

8. A wave power park comprising a plurality of arrays according to claim 1, wherein the marine substations of the arrays are also arranged on a third symmetric, open, concave line, the symmetric, open, concave line having a third opening.

9. The wave power park according to claim 8, wherein the third opening is directed away from the primary wave direction.

10. The wave power park according to claim 8, wherein the third symmetric, open, concave line is any of a V-shaped line, a U-shaped line, an open arched line, an open circular line, an open elliptic line or a combination thereof.

11. The array according to claim 5, wherein the regular distances are from 20 m to 35 m.

* * * * *

UNITED STATES PATENT AND TRADEMARK OFFICE
CERTIFICATE OF CORRECTION

PATENT NO. : 12,135,005 B2
APPLICATION NO. : 18/008835
DATED : November 5, 2024
INVENTOR(S) : Francisco Gemo Albino Francisco and Anders Kronberg Page 1 of 1

It is certified that error appears in the above-identified patent and that said Letters Patent is hereby corrected as shown below:

In the Claims

Column 10 Lines 1-2 "wherein a symmetry axis is at parallel to a primary wave direction" should be "wherein a symmetry axis is parallel to a primary wave direction"

Column 10 Lines 33-35 "wherein the wave energy converters are, equally distributed on each side of the symmetry axis" should be "wherein the wave energy converters are equally distributed on each side of the symmetry axis"

Signed and Sealed this
Twenty-first Day of January, 2025

Coke Morgan Stewart
*Acting Director of the United States Patent and Trademark Office*